United States Patent [19]

Quin et al.

[11] Patent Number: 4,505,295
[45] Date of Patent: Mar. 19, 1985

[54] APPARATUS FOR INSERTING A SHUT-OFF DEVICE LATERALLY INTO A PIPE

[75] Inventors: René A. Quin, Harskirchen; Paul A. Wiet, Le Chesnay; Jean-Louis M. Caputi, Paris, all of France

[73] Assignee: Compagnie Francaise Des Petroles, Paris, France

[21] Appl. No.: 571,167

[22] Filed: Jan. 16, 1984

[30] Foreign Application Priority Data

Jan. 26, 1983 [FR] France .................................. 83 1143

[51] Int. Cl.³ .......................................... F16K 43/00
[52] U.S. Cl. ..................................... 137/315; 137/319; 138/93; 138/94
[58] Field of Search ............... 137/315, 317, 319, 320, 137/322; 138/89, 93, 94

[56] References Cited

U.S. PATENT DOCUMENTS

| 2,482,696 | 9/1949 | Smith et al. | 138/94 |
| 2,812,778 | 11/1957 | Ver Nooy | 138/94 |
| 2,906,295 | 9/1959 | Ver Nooy | 138/94 |
| 3,025,885 | 3/1962 | Ver Nooy | 138/94 |
| 3,665,966 | 5/1972 | Ver Nooy | 138/94 |
| 3,842,864 | 10/1974 | Riegel et al. | 138/93 |
| 4,064,912 | 12/1977 | Petrone | 138/94 |

FOREIGN PATENT DOCUMENTS 1340431 12/1973 United Kingdom .................. 138/94

Primary Examiner—George L. Walton
Attorney, Agent, or Firm—Sughrue, Mion, Zinn, Macpeak and Seas

[57] ABSTRACT

An apparatus for inserting a shut-off device 9 laterally into a pipe via a branch 48 which is inclined at an obtuse angle to the pipe, comprises a housing 1 for connection at one end to the branch and containing a first carriage 6 which is movable relative to the housing to a forward position projecting from the housing into the pipe and includes a receptacle for the shut-off device and a guide member 8 for guiding the shut-off device out of the receptacle, a second carriage 10 which is movable relative to the first carriage and is connected to the shut-off device by an insertion jack 13, and displacement means for first moving the first carriage to its forward position, the second carriage moving with the first carriage, and for then moving the second carriage relative to the first carriage to move the shut-off device out of its receptacle further into the pipe, the insertion jack finally being operated to move the shut-off device into position in the pipe.

5 Claims, 9 Drawing Figures

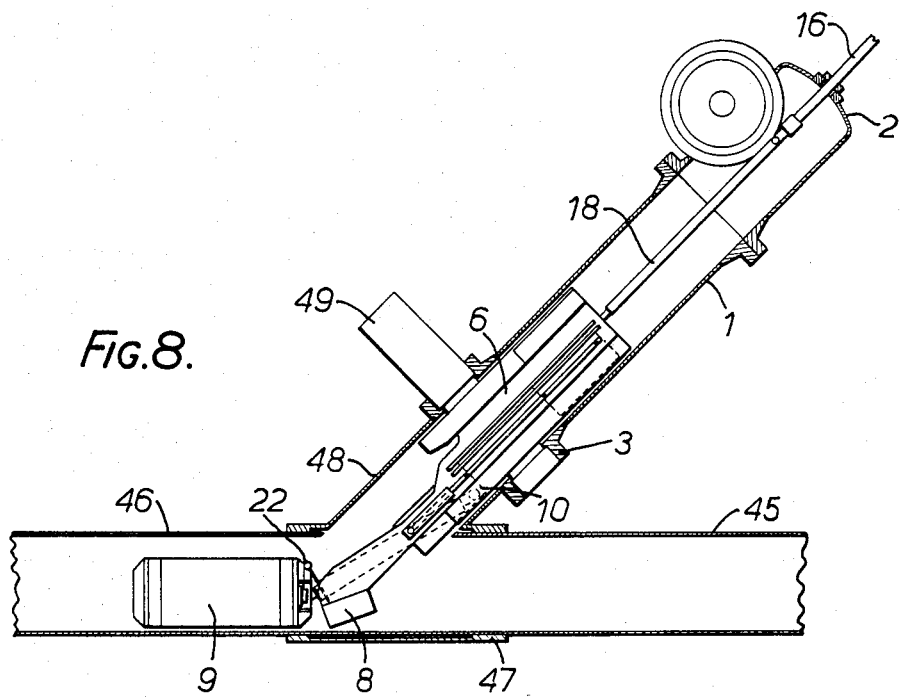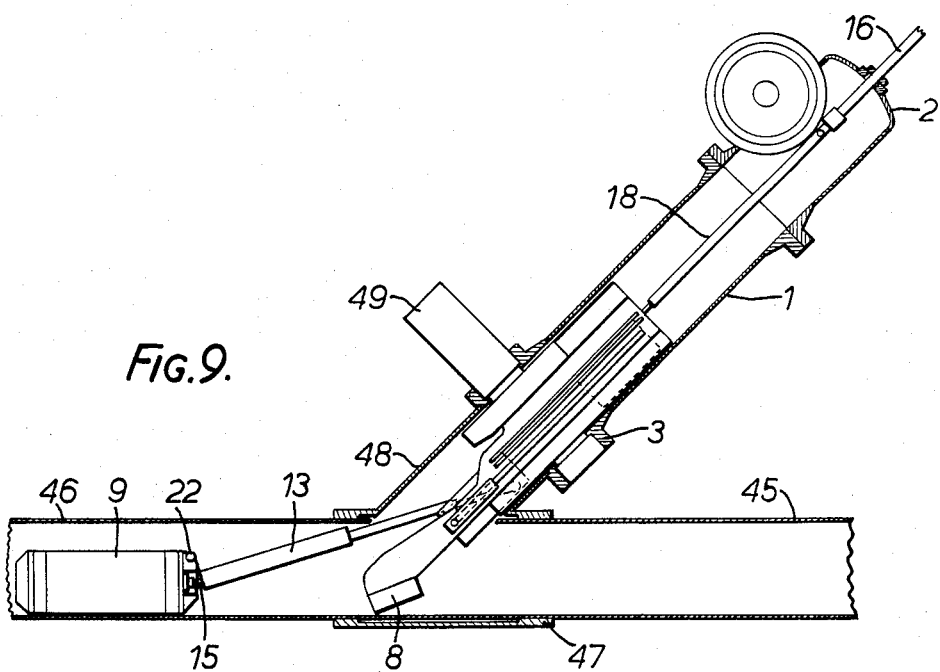

APPARATUS FOR INSERTING A SHUT-OFF DEVICE LATERALLY INTO A PIPE

BACKGROUND OF THE INVENTION

The present invention relates to an apparatus for the insertion of a radially expandable shut-off device into a pipe portion via an auxiliary branch inclined at an obtuse angle to the pipe portion.

The problem of inserting such a shut-off device arises, in particular, when it is intended to repair or modify a pipe containing a fluid under pressure and when it is therefore necessary to isolate the pipe portion on which the operation will be carried out by means of shut-off devices according to the so-called "cold-tapping" technique. It may also be appropriate to insert a shut-off device in this way likewise in the so-called "hot-tapping" technique.

This problem is difficult to solve because the obtuse angle between the portion and the branch cannot be very large, usually approximately 135° C., and because the radial movement of the shut-off device between its extended position and its retracted position is somewhat limited.

SUMMARY OF THE INVENTION

According to the invention there is provided an insertion apparatus for inserting a shut-off device into a pipe portion via a branch which is inclined at an obtuse angle to the pipe portion, the insertion apparatus comprising a cylindrical housing having a rear end and a front end, means for closing the rear end of the housing and fastening means for fastening the housing to the branch at the front end of the housing which is open, first longitudinal guide means on the housing, a first elongate carriage comprising at the front a guide member for guiding the shut-off device and which is provided with engagement means for engaging the first guide means for longitudinal movement thereof between a rear position in which the first carriage is contained in the housing, and a forward position in which the guide member is capable of projecting into the pipe portion, second longitudinal guide means carried by the first carriage, a second carriage which is mounted in the first carriage, is connected to the shut-off device by an articulated insertion jack directed forwardly, and which is provided with engagement means for engaging the second longitudinal guide means for relative longitudinal movement thereof between a rear position, in which, with the insertion jack in an inactive condition, the shut-off device is located on the guide member, and a forward position, in which, with the insertion jack in the inactive condition, the shut-off device has moved off the guide member, controlled displcement means for displacing the first carriage in the housing from its rear position to its forward position and for displacing the second carriage relative to the first carriage from its rear position to its forward position, and means for actuating the insertion jack.

The controlled displacement means may include a first carriage displacement jack connected between the housing and the first carriage and a second carriage displacement jack connected between the first carriage and the second carriage. Alternatively, the controlled displacement means may comprise a carriage displacement jack connected between the housing and the second carriage and retractable mechanical-connection means between the first carriage and the second carriage, the connection means being retracted when the first carriage arrives in its forward position.

The retractable mechanical-connection means may comprise a bolt mounted on the second carriage and biassed by a spring so as to extend through an orifice in the first carriage and bear against a bearing surface on said housing, the orifice being limited in the forward direction by an edge forming a set-back slope, whilst the bearing surface has a run-on slope which projects such that it can cause the bolt to move back against the action of the spring when the first carriage reaches its forward position, the bolt having a front edge which is inclined so that the bolt then moves along the set-back slope.

Retractable locking means may be provided for locking the first carriage relative to the housing, and the locking means may be effective when the first carriage has reached its forward position and when the second carriage has left its rear position, and may be retracted only when the second carriage has returned to its rear position.

The retractable locking means may comprise a bolt mounted on the housing and biassed by a spring to extend through an orifice in the first carriage and to bear against a bearing surface on the second carriage, the orifice being aligned with the bolt when the first carriage is in the forward position and being provided in the forward direction with an edge forming a setback slope, the bearing surface having a run-on slope which projects such that it can cause the bolt to move back against the bias of the spring when the second carriage returns to its rear position, the bolt having a front edge which is inclined so that the bolt then moves onto the set-back slope while the set-back slope is moved with the second carriage relative thereto.

BRIEF DESCRIPTION OF THE DRAWINGS

An embodiment of the invention will now be described, by way of example only, with reference to the accompanying drawings.

In the drawings:

FIGS. 6 to 9 show diagrammatically successive positions assumed by the components of the insertion apparatus when used on a pipe.

DETAILED DESCRIPTION OF THE PREFERRED EMBODIMENT

Figure 1:
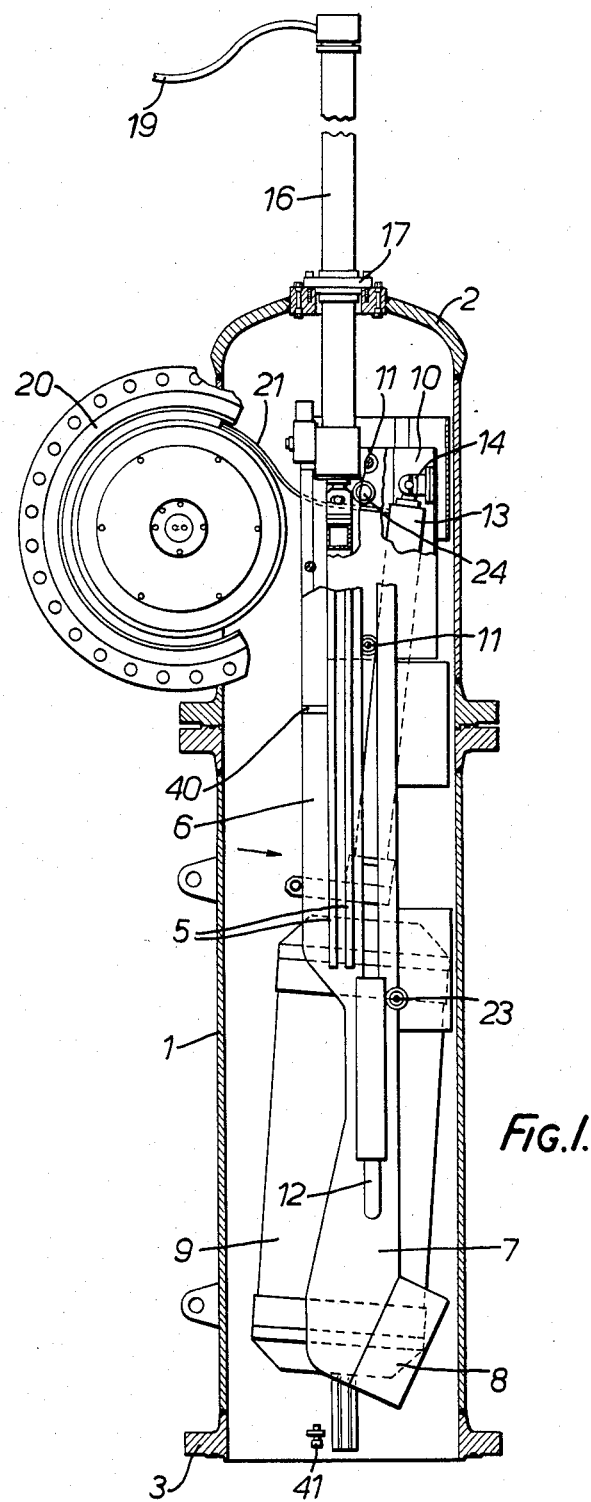
FIG. 1 shows, partly in section and partly in elevation, an embodiment of an insertion apparatus for a shut-off device according to the present invention.
Figure 2:
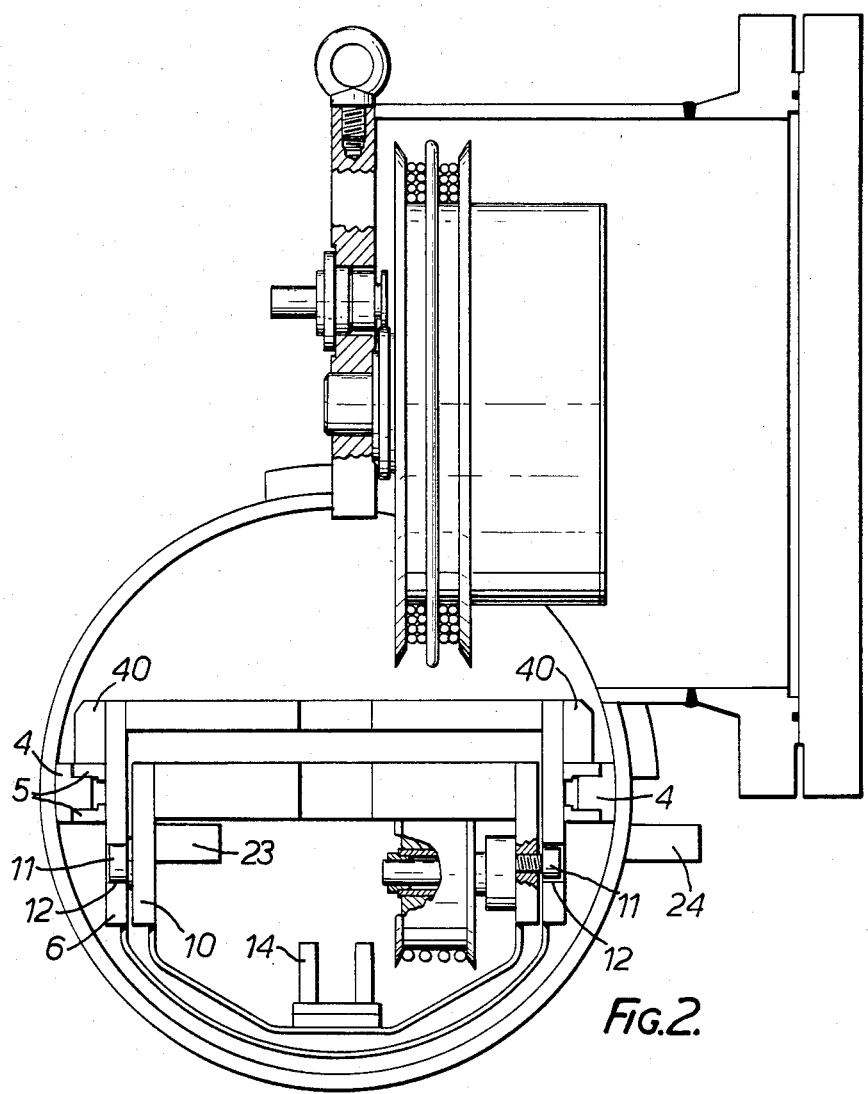
FIG. 2 shows an end view of the apparatus of FIG. 1 on a larger scale and with parts removed.

The insertion apparatus for a shut-off device shown in FIGS. 1 and 2 comprises a housing 1 in the form of a cylinder closed at its rear longitudinal end by an end member 2 and open at its front longitudinal end where it is provided with a fastening collar 3 for fastening it to an auxiliary inlet branch in a pipe, as shown in FIGS. 6 to 9.

Two longitudinal guide rails 4, which can be seen in FIG. 2, are mounted within and on the housing 1. Each of these guide rails 4 is engaged between two longitudinal members 5 carried by a first carriage 6 of elongate shape, and which are slidable along the rails. At the front, the first carriage 6 carries a receptacle 7 for receiving a shut-off device 9 connected to a second carriage 10, and which has a guide slope or member 8 for guiding the device 9 out of the receptacle and into the pipe. Rollers 11 carried by the second carriage 10 are engaged in two bearing races 12 provided in the first carriage 6 to guide the second carriage in longitudinal movement relative to the first carriage. The second carriage pushes the shut-off device 9 by means of an insertion jack 13 articulated at one end on a bracket 14 carried by the second carriage and at the other end on a pivot 15 carried by the shut-off device 9, as can be seen in FIG. 9.

In FIG. 1, the two carriages 6 and 10 have been shown in their rear or retracted positions, the assembly as a whole being contained completely within the housing 1, the rear positions constituting limiting positions.

Figure 7:
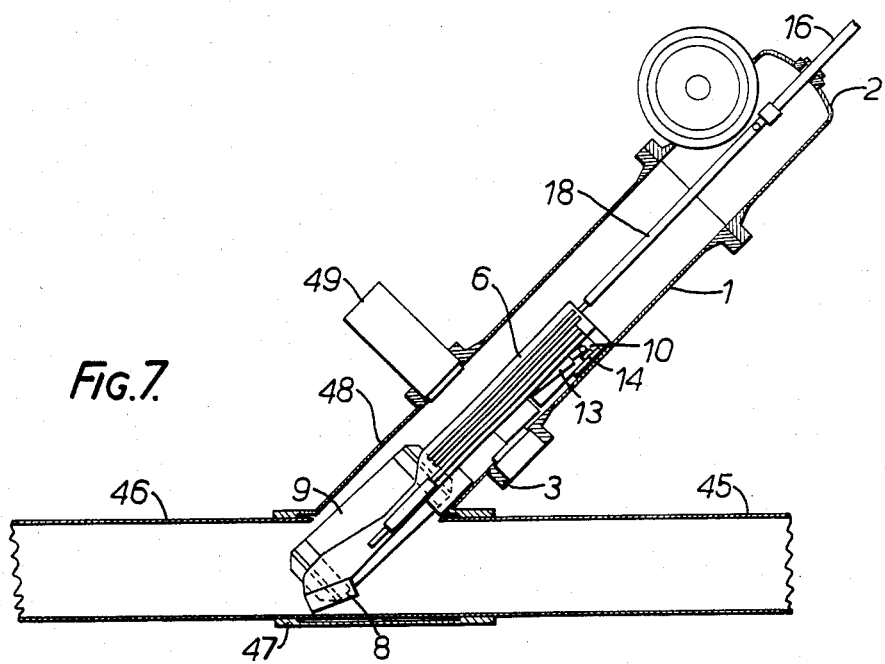

The forward displacement of the carriages 6 and 10 is effected by means of a carriage displacement jack 16, the cylinder of which passes through the end member 2 of the housing 1, to which it is connected in a leak-proof manner by a fastening piece 17 and of which the piston 18, which can be seen in FIGS. 7 to 9, is attached to the second carriage 10 at its free end. The jack 16 is supplied with actuating fluid via an umbilical line 19 connected to a hydraulic unit (not shown) which is mounted on a frame (not shown) installed nearby and which is equipped with control levers for use by an operator, who can be a diver if an operation is to be carried out on a submerged pipe.

The hydrualic unit is also connected to a drum 20 mounted on the housing 1, and an umbilical line 21 wound on the drum 20 connects the hydraulic unit to the second carriage 10, by means of the drum 20 and a guide pulley mounted on the second carriage for supplying the insertion jack 13, the shut-off device 9 and a hydraulic connector 22, which can be seen in FIGS. 8 and 9 and which is located at one end of the shut-off device 9.

Retractable mechanical-connection means 23 located between the first carriage 6 and the second carriage 10 have been illustrated merely by their location in FIGS. 1 and 2, but they will be described in more detail with reference to FIGS. 3 and 4.

Retractable locking means 24 located between the housing 1 and the first carriage 6 have been illustrated merely by their location in FIGS. 1 and 2, but they will be described in more detail with reference to FIGS. 3, 4 and 5.

Figures 3, 4:
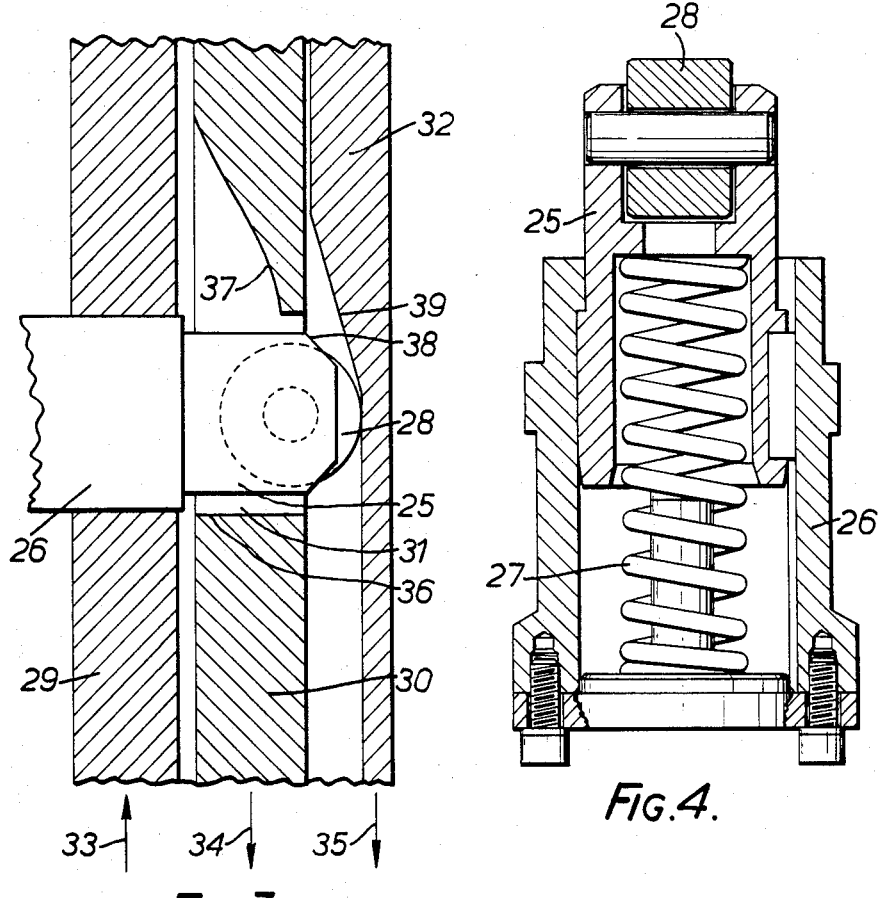
FIG. 3 is a diagrammatic view of a bolt apparatus for use in the insertion assembly of FIG. 1.
FIG. 4 is a section through the bolt assembly of FIG. 3.
Figure 5:
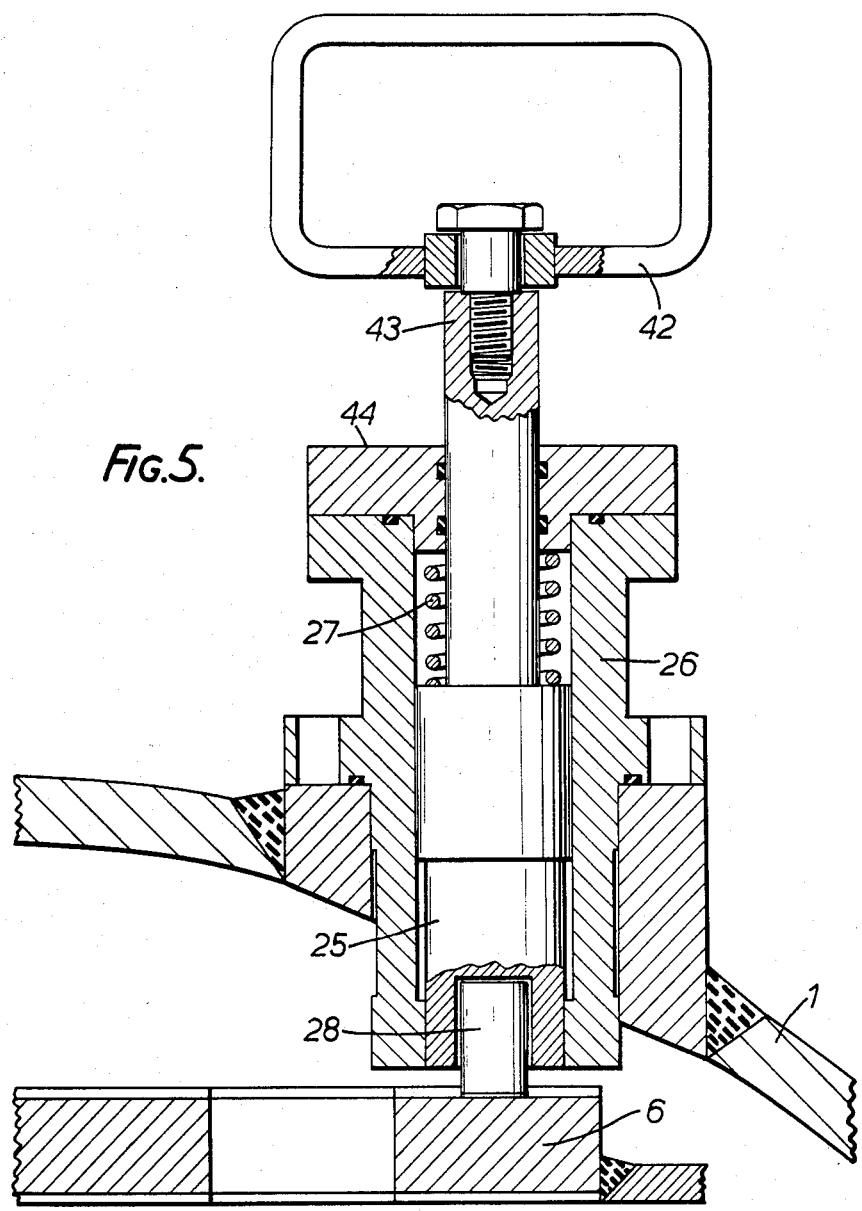
FIG. 5 shows, in section, the bolt assembly of FIGS. 3 and 4 arranged for locking the first carriage on the housing of FIG. 1.

FIGS. 3, 4 and 5 show an embodiment of a retractable mechanical-connection means 23 or of a retractable locking means 24, comprising a bolt 25 retained by a casing 26 in which a compression spring 27 is inserted for the purpose of biassing the bolt 25 outwardly of the casing 26. The end of the bolt 25 projecting from the casing 26 carries a castor 28.

In FIG. 3, the casing 26 is carried by a supporting piece 29. The bolt 25, in its extended position under the action of the spring 27, extends through an orifice 31 in a retaining piece 30 and bears by means of the castor 28 against a bearing piece 32. The pieces 29, 30 and 32 extend parallel to one another. Arrows 33, 34 and 35 indicate possible relative directions of movement of the pieces 29, 30 and 32 respectively and will be used to explain how the bolt is used and operates. These arrows define parallel longitudinal directions of displacement of the pieces. In these directions, the orifice 31 is limited by a first edge 36 and a second edge 37. The first edge 36 is perpendicular to the retaining piece 30, whilst the second edge 37 forms a set-back slope capable of coming in contact with an inclined edge 38 of the bolt 25 when the latter is pushed back against the bias of the spring. The bearing piece 32 has a projecting run-on slope 39 extending towards the retaining piece 30.

When the bolt 25 constitutes the retractable mechanical-connection means 23, the piece 29 is solid with the second carriage 10, the piece 30 is solid with the first carriage 6 and the piece 32 is solid with the housing 1. The arrow 33 indicates the direction of forward displacement of the second carriage 10 under the action of the carriage displacement jack 16. It will be seen that the piece 29 drives the piece 30 in its forward displacement as long as the castor 28 has not reached the slope 39. When the castor 28 ascends the slope 39, the inclined edge 38 is taken up by the slope 37, and the bolt 25 is pushed back against the bias of the spring and withdrawn from the orifice 31, thus separating the pieces 29 and 30 and allowing the second carriage 10 to continue its forward displacement alone, the first carriage 6 then being retained and prevented from further movement by stop-pieces 40 on carriage 6 coming into abutment with adjustable fixed abutments 41 which can be seen in FIG. 1.

When the bolt 25 constitutes the retractable locking means 24, the piece 29 is solid with the housing 1, the piece 30 is solid with the first carriage 6 and the piece 32 is solid with the second carriage 10. When the first carriage 6, moving in the opposite direction to the arrow 34, has come to a stop because the stop pieces 40 have come into abutment with the abutments 41, the bolt 25 penetrates into the orifice 31 to lock the first carriage relative to the housing, and the second carriage 10 continues its travel alone in the opposite direction to the arrow 35, its slope 39 moving away from the castor 28. During the opposite movement of the second carriage 10 in the direction of the arrow 35, the first carriage 6 remains locked on the housing 1, until the slope 39 pushes back the castor 28 and allows the slope 37 to come into contact with the inclined edge 38. The first carriage 6 is then driven in the direction of the arrow 34 by the second carriage 10, because the latter has arrived at the rear end of its possible displacement relative to the first carriage 6.

FIG. 5 illustrates the method of assembling a casing 26 for a bolt 25 on the housing 1 to ensure retractable locking of the first carriage 6 on the housing 1. In addition, a handle 42 is connected to the bolt 25 by means of a rod 43 passing through the end 44 of the casing 26 in a leak-proof manner to enable release of the bolt 25 by hand in the event that a failure of the automatic release mechanism occurs.

FIGS. 6 to 9 will now be referred to in order to explain how the above-described insertion housing for a shut-off device may be used.

Figure 6:
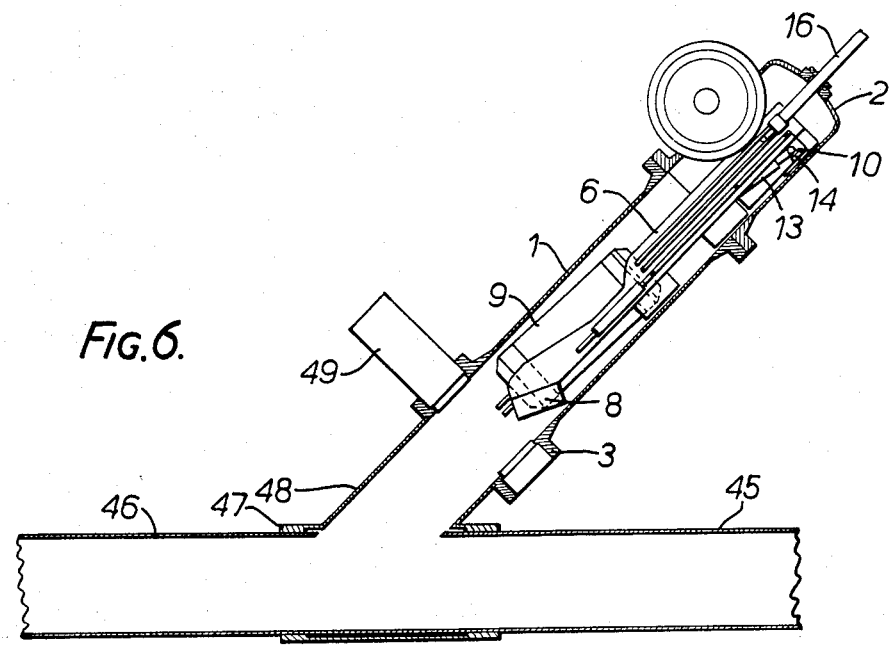

By way of example, to enable a first portion 45 of a submerged pipe to be repaired or modified, a shut-off device is to be inserted into a second portion 46 of the pipe. For this purpose, a sleeve 47 is installed around the pipe in a leak-proof manner, the sleeve consisting of two shells, one of which carries an inclined branch 48 forming, for example, an angle of 135° with the axis of the pipe portion 46. This branch 48 is provided with an intermediate valve called a "sandwich valve" 49, the outer end of which can receive the jacket of a machine for perforating the pipe or of another apparatus. In FIG. 6, the perforating machine has been removed and replaced by the housing 1 fastened to the valve 49 by means of the fastening collar 3.

The carriage displacement jack 16 is then actuated to move the first carriage 6 driven by the second carriage 10, until the guide member 8 arrives approximately at the bottom of the pipe, as shown in FIG. 7. This is the forward position of the first carriage which is reached when the stop pieces 40 of the first carriage 6 are in abutment with the abutments 41 (FIG. 1).

At this moment, the second carriage 10 separates from the first carriage 6 and continues its advance, thus causing the shut-off device 9 to leave its receptacle on the first carriage 6 and enter further into the pipe portion 46, as shown in FIG. 8.

The insertion jack 12 is then actuated in order to move the shut-off device 9 further along in the pipe portion 46, as shown in FIG. 9. The shut-off device 9 is subsequently inflated, the connector 22 is then operated to disconnect the jack 13 from the device 9, the jack 13 is retracted, the second carriage 10 is partially withdrawn, and the two carriages 10 and 6 as a unit are then withdrawn and returned into the housing 1, after which the latter can be detached from the valve 49.

What is claimed is:

1. An insertion apparatus for inserting a shut-off device (9) into a pipe portion (46) via a branch (48) inclined at an obtuse angle to the pipe portion, comprising:

a cylindrical housing (1) having an open rear end and an open front end;

means (2) for closing the rear end of the housing;

fastening means (3) for fastening the housing to the branch at the front end of the housing;

first longitudinal guide means (4) on the housing;

a first elongate carriage (6) comprising a guide member (8) at a front thereof for guiding the shut-off device, and engagement means (5) for engaging said first guide means for longitudinal movement of said first carriage relative to said housing between a rear position in which said first carriage is contained in said housing, and a forward position in which said guide member is capable of projecting into the pipe portion;

second longitudinal guide means (12) carried by said first carriage;

a forwardly directed, articulated insertion jack (13) connected to the shut-off device and having a retracted position and an extended position;

a second carriage (10) mounted in the first carriage, connected to said articulated insertion jack for connection to said shut-off device, and provided with engagement means (11) for engaging said second longitudinal guide means for longitudinal movement of said second carriage relative to said first carriage between a rear position in which said insertion jack is in said retracted position and the shut-off device is located on said guide member, and a forward position in which said insertion jack is in said extended position and the shut-off device is moved off said guide member and into said pipe portion;

controlled displacement means (16) for displacing said first carriage in the housing from its rear position to its forward position and for displacing said second carriage relative to said first carriage from its rear position to its forward position;

means for actuating said insertion jack, and means (22) for disconnecting the insertion jack from the shut-off device to enable the withdrawal of the first and second carriages.

2. An apparatus according to claim 1, wherein said controlled displacement means comprises a carriage displacement jack connected between said housing and said second carriage, and retractable mechanical-connection means (23) between said first carriage and said second carriage, said connection means being retracted when said first carriage arrives in its forward position.

3. An apparatus according to claim 2, wherein said retractable mechanical-connection means comprise a bolt 25 mounted on said second carriage and biassed by a spring 27 so as to extend through an orifice in said first carriage and bear against a bearing surface solid with said housing, said orifice being limited at the front by an edge forming a set-back slope, said bearing surface having a projecting run-on slope arranged to cause said bolt to move back against said bias of said spring when said first carriage reaches its forward position, said bolt having an inclined front edge such that said bolt then moves along said set-back slope.

4. An apparatus according to claim 1, including retractable locking means 24 mounted on said housing for locking said first carriage relative to said housing, said locking means being effective when said first carriage has reached its forward position and when said second carriage has left its rear position, and being retracted only when said second carriage has returned to its rear position.

5. An apparatus according to claim 4, wherein said retractable locking means comprise a bolt mounted on said housing and biassed by a spring so as to extend through an orifice in said first carriage and bear against a bearing surface solid with said second carriage, said orifice being arranged to be aligned with said bolt when said first carriage is in its forward position and being limited at the front by an edge forming a set-back slope, said bearing surface having a projecting run-on slope arranged to cause said bolt to move back against said bias of said spring when said second carriage returns to its rear position, said bolt having an inclined front edge such that said bolt then moves along said set-back slope when said set-back slope is moved relative thereto by said second carriage.

* * * * *